(12) United States Patent
Thompson

(10) Patent No.: US 10,597,167 B1
(45) Date of Patent: Mar. 24, 2020

(54) TIME TO ALTITUDE DISPLAY SYSTEM AND METHOD

(71) Applicant: Rockwell Collins, Inc., Cedar Rapids, IA (US)

(72) Inventor: Bradley R. Thompson, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 9 days.

(21) Appl. No.: 16/030,208

(22) Filed: Jul. 9, 2018

(51) Int. Cl.
  *B64D 43/02* (2006.01)
  *G01C 23/00* (2006.01)
(52) U.S. Cl.
  CPC .......... *B64D 43/02* (2013.01); *G01C 23/005* (2013.01)
(58) Field of Classification Search
  CPC .................. B64D 43/02; G01C 23/005
  See application file for complete search history.

(56) References Cited

U.S. PATENT DOCUMENTS

| | | | | |
|---|---|---|---|---|
| 4,870,412 A | * | 9/1989 | Vuichard | G05D 1/0066 340/946 |
| 6,085,129 A | * | 7/2000 | Schardt | G01C 23/00 340/971 |
| 7,765,061 B1 | | 7/2010 | Barber et al. | |
| 8,099,201 B1 | | 1/2012 | Barber et al. | |
| 8,188,889 B2 | * | 5/2012 | Shafaat | G01C 23/005 340/945 |
| 2009/0153343 A1 | * | 6/2009 | Shafaat | G01C 23/005 340/686.1 |

* cited by examiner

*Primary Examiner* — Sisay Yacob
(74) *Attorney, Agent, or Firm* — Suiter Swantz pc llo

(57) ABSTRACT

Systems and methods for displaying range and time to altitude for an aircraft are disclosed. In embodiments, a system includes a flight management system configured to receive flight data from a plurality of sensors, wherein the flight data includes altitude and vertical speed measurements. The system further includes an aircraft display system and controller. The controller is in communication with the flight management system and the aircraft display system. The controller is configured to receive a selected target altitude and generate a range to altitude arc at a display of the aircraft display system based on the flight data and the selected target altitude. The controller is further configured to determine a time to altitude based on the flight data and the selected target altitude and configured to present the time to altitude in proximity to the range to altitude arc at the display of the aircraft display system.

17 Claims, 8 Drawing Sheets

TIME TO ALTITUDE DISPLAY SYSTEM AND METHOD

BACKGROUND

Existing navigation displays provide a selectable indication of distance (or range) to reach a target altitude, which is known as the "range to altitude arc." While this is a useful symbology for determining at which distance along the flight path a target altitude will be reached, it does not provide any time-related information.

Occasionally, Air Traffic Control (ATC) will issue a clearance that requires reaching an altitude within a certain amount of time. For example, ATC may issue commands such as "N1234, descend and maintain flight level two five zero. Be level at flight level two five zero in five minutes or less." or "N1234, descend and maintain flight level two four zero. I need you out of flight level two seven zero in three minutes." Today, upon hearing this type of clearance, a pilot will likely start an elapsed timer and initiate the descent by dialing in the target altitude and selecting a descent mode (e.g., vertical speed (VS) or flight path angle (FPA)). Once started down, the pilot must manually (e.g., by mental math) determine the descent rate required to reach the cleared altitude in time.

Having to manually determine the required descent rate increases pilot workload and can result in errors and/or violation of an ATC clearance. For example, a target altitude may not be reached in time due to a mental math error by the pilot. In some cases to avoid violating the clearance, a pilot may descend at a faster rate than required, potentially at an uncomfortable rate for the passengers. To avoid potential errors, pilot distraction, and/or passenger discomfort, there is a need in the art for improved methods of displaying time and range to altitude information.

SUMMARY

In an aspect, embodiments of the inventive concepts disclosed herein are directed to a system for displaying range and time to altitude. In embodiments, the system includes a flight management system in communication with a plurality of sensors. The flight management system is configured to receive flight data from the plurality of sensors including altitude and vertical speed measurements. The system further includes an aircraft display system and controller. The controller is in communication with the flight management system and the aircraft display system. In some embodiments, the controller is part of the flight management system. In other embodiments, the controller is communicatively coupled (e.g., via wired or wireless connection) to the flight management system. The controller is configured to receive a selected target altitude (e.g., based on a user input, predetermined data, and/or an instruction/command received from air traffic control, or the like). The controller is then configured to generate a range to altitude arc at a display of the aircraft display system based on the flight data and the selected target altitude. The controller is further configured to determine a time to altitude based on the flight data and the selected target altitude and is configured to present the time to altitude in proximity to the range to altitude arc at the display of the aircraft display system. For example, the range to altitude arc and the time to altitude (and possibly other parameters associated with the time to altitude) can be presented on an electronic map generated at the display of the aircraft display system.

In another aspect, embodiments of the inventive concepts disclosed herein are directed to a method of displaying range and time to altitude. In implementations, the method includes detecting flight data including altitude and vertical speed measurements and receiving a selected target altitude. A range to altitude arc is then generated at a display of an aircraft display system based on the flight data and the selected target altitude. The method further includes determining a time to altitude based on the flight data and the selected target altitude and presenting the time to altitude in proximity to the range to altitude arc at the display of the aircraft display system. For example, the range to altitude arc and the time to altitude (and possibly other parameters associated with the time to altitude) can be presented on an electronic map generated at the display of the aircraft display system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
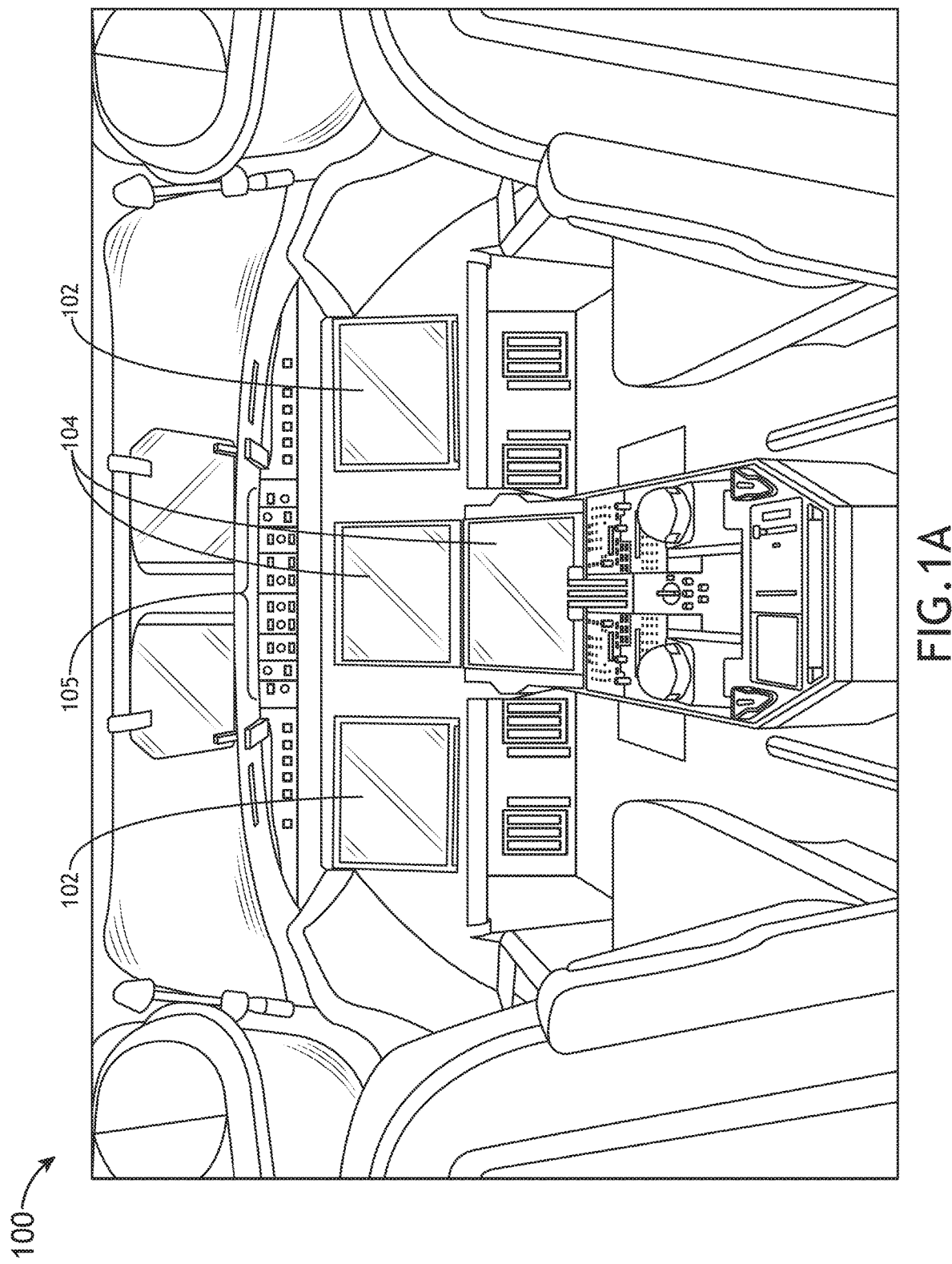
FIG. 1A is an illustration of an aircraft environment in which a system for displaying range and time to altitude may be implemented, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods for displaying range and time to altitude for an aircraft. In embodiments, time related readouts are generated and presented next to a range to altitude arc on an electronic map at a display of an aircraft display system. Additionally, in some embodiments, a range to altitude indication is provided on a vertical situation display (VSD) at the display of the aircraft display system, with an accompanying readout of time or arrival at the altitude. The time related readouts can include, but are not limited to: a selected target altitude; a selected vertical speed and/or flight path angle; time of arrival at target altitude (e.g., absolute (UTC) time of arrival); and/or time to altitude (e.g., relative time (from current time) to arrival at the target altitude). Displaying time related readouts with the range to altitude arc enables a pilot to visually confirm that an altitude clearance can be met at a certain time limit, that is, without having to go through the extra workload of mental math or programming an altitude constraint and range to altitude into the flight plan being implemented by the flight management system (FMS) of an aircraft.

FIG. 1A illustrates an example embodiment of an aircraft environment 100 in which a system and method for displaying range and time to altitude for an aircraft may be implemented. For example, the aircraft environment 100 (e.g., a cockpit) includes one or more displays that can be employed to present electronic maps, aircraft performance parameters, aircraft performance parameter predictions, sensor readings, aircraft data, flight data, communications, alerts, and so forth. The aircraft environment 100 in FIG. 1A is shown to include at least one primary flight display 102 and at least one multi-function display 104 that are viewable by a flight crew member (e.g., pilot). The aircraft environment 100 illustrated in FIG. 1A illustrates an example embodiment. However, in other embodiments, the aircraft 100 environment can include any number of display devices (e.g., one, two, three, or more displays) including one or more primary flight displays, secondary flight displays, and/or multi-function displays.

Figure 1B:
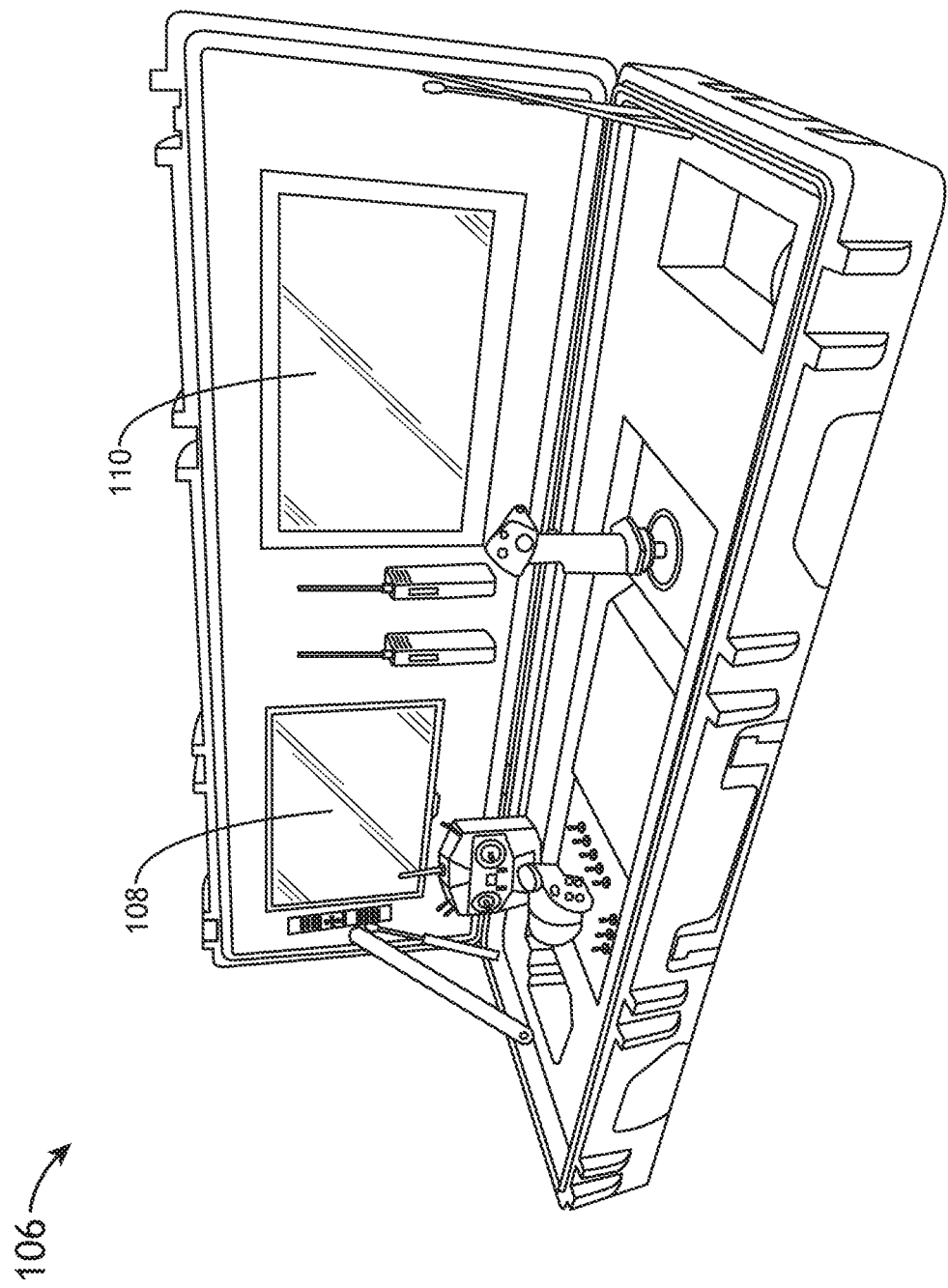
FIG. 1B is an illustration of an unmanned aerial vehicle (UAV) control station in which a system for displaying range and time to altitude may be implemented, in accordance with example embodiments of this disclosure.

The system and method for displaying range and time to altitude for an aircraft can also be implemented in unmanned aerial vehicle (UAV) systems. For example, FIG. 1B illustrates an example embodiment of a UAV control station 106 in which a system and method for displaying range and time to altitude for an aircraft may be implemented. The UAV control station 106 may include any number of displays. For example, the UAV control station 106 in FIG. 1B is shown to include a first display 108 and a second display 110. In some embodiments, the UAV control station 106 is portable (e.g., as illustrated in FIG. 1B). In other embodiments, the UAV control station 106 may be within a facility or a moving vehicle (e.g., van, truck, boat, other aircraft, etc.).

Figure 2A:
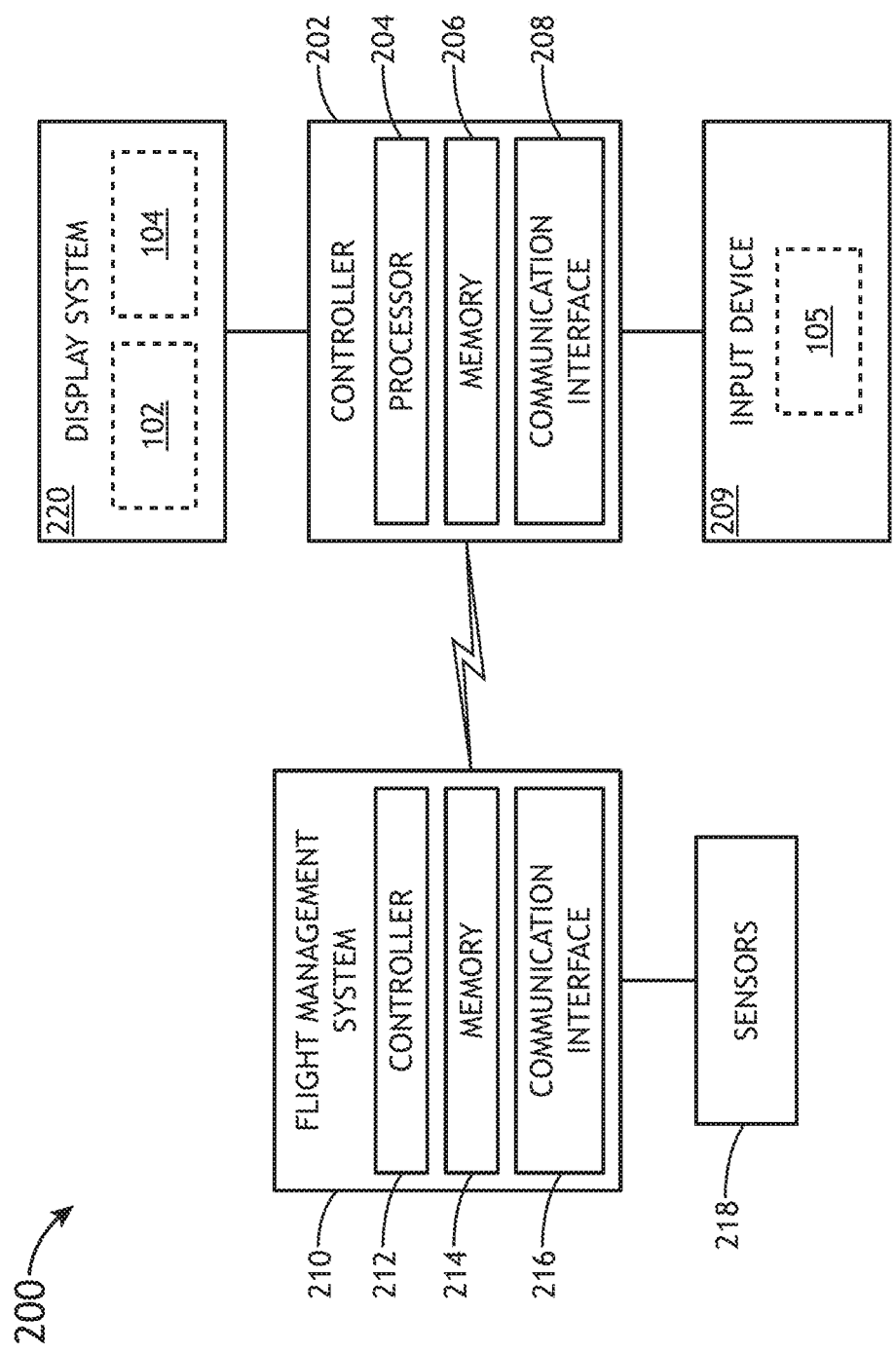
FIG. 2A is a block diagram illustrating a system for displaying range and time to altitude via a display of an aircraft display system, in accordance with example embodiments of this disclosure.
Figure 2B:
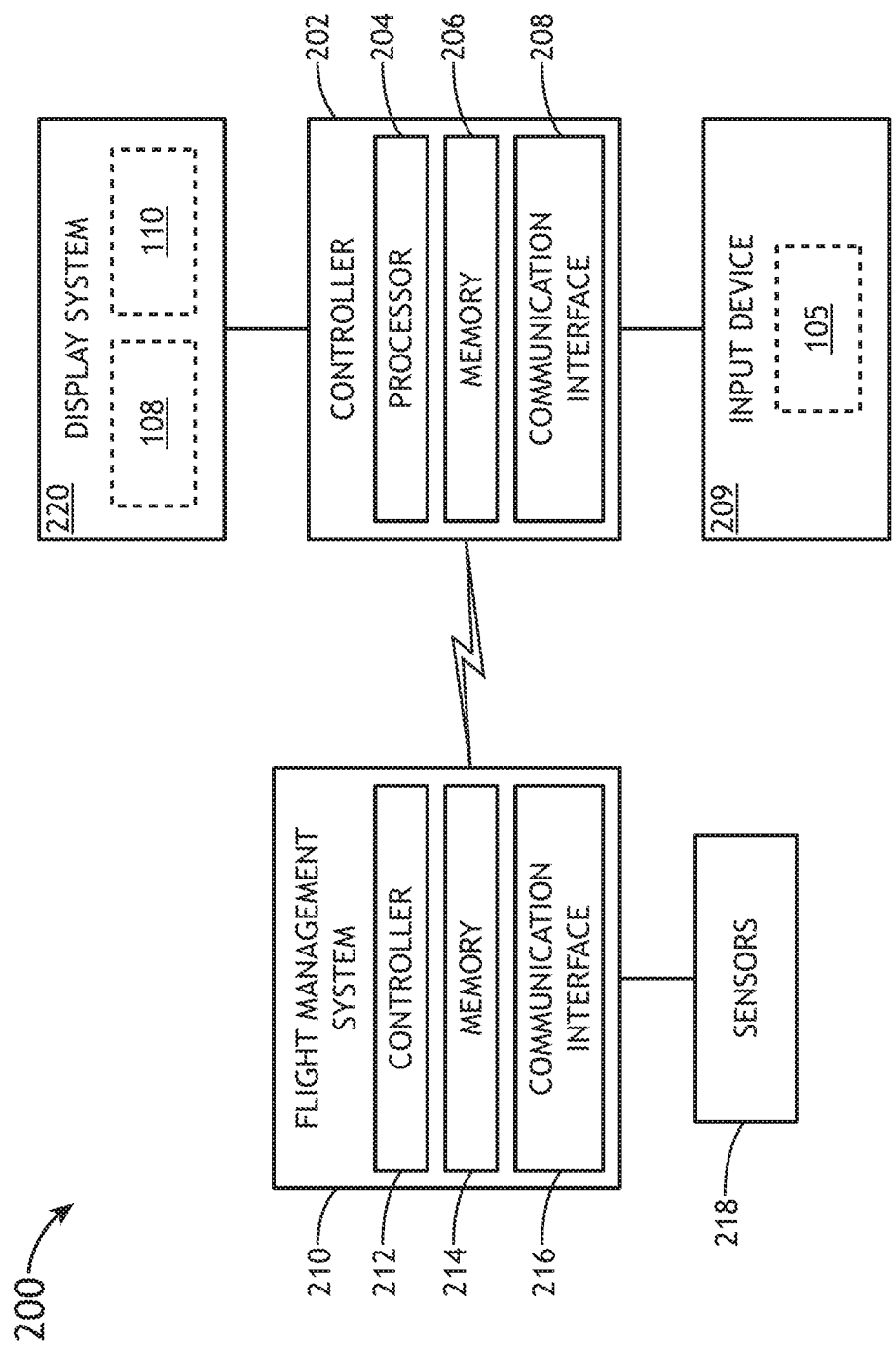
FIG. 2B is a block diagram illustrating a system for displaying range and time to altitude via a display of an aircraft display system, in accordance with example embodiments of this disclosure.

FIGS. 2A and 2B illustrate embodiments of a system 200 for displaying range and time to altitude for an aircraft. The system 200 includes an aircraft display system 220 having at least one display, for example, a primary flight display 102, a multi-function display 104, or any other type of aircraft display (e.g., another onboard display, a UAV controller display 108/110, or the like). The system 200 further includes a controller 202 in communication with the aircraft display system 220. For example, the controller 202 can be communicatively coupled to and/or integrated within a structure of the aircraft display system 220.

In embodiments, the controller 202 includes a processor 204, memory 206, and a communication interface 208. The processor 204 provides processing functionality for at least the controller 202 and can include any number of processors, micro-controllers, circuitry, field programmable gate array (FPGA) or other processing systems, and resident or external memory for storing data, executable code, and other information accessed or generated by the controller 202. The processor 204 can execute one or more software programs embodied in a non-transitory computer readable medium (e.g., memory 206) that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

The memory 206 can be an example of tangible, computer-readable storage medium that provides storage functionality to store various data and/or program code associated with operation of the controller 202/processor 204, such as software programs and/or code segments, or other data to instruct the processor 204, and possibly other components of the controller 202, to perform the functionality described herein. Thus, the memory 206 can store data, such as a program of instructions for operating the controller 202, including its components (e.g., processor 204, communication interface 208, etc.), and so forth. It should be noted that while a single memory 206 is described, a wide variety of types and combinations of memory (e.g., tangible, non-transitory memory) can be employed. The memory 206 can be integral with the processor 204, can comprise stand-alone memory, or can be a combination of both. Some examples of the memory 206 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 208 can be operatively configured to communicate with components of the controller 202. For example, the communication interface 208 can be configured to retrieve data from the processor 204 or other devices (e.g., flight management system 210, sensors 218, etc.), transmit data for storage in the memory 206, retrieve data from storage in the memory 206, and so forth. The communication interface 208 can also be communicatively coupled with the processor 204 to facilitate data transfer between components of the controller 202 and the processor 204. It should be noted that while the communication interface 208 is described as a component of the controller 202, one or more components of the communication interface 208 can be implemented as external components communicatively coupled to the controller 202 via a wired and/or wireless connection. The controller 202 can also include and/or connect to one or more input/output (I/O) devices (e.g., via the communication interface 208), such as a display system 222 (e.g., including display 102 and/or display 104, or display 108 and/or display 110), one or more sensors (e.g., sensors 218, etc.), an input device 209 (e.g., a flight/mode control panel 105, a mouse, a trackball, a trackpad, a joystick, a line select device, a touchpad, a touchscreen, a keyboard, a keypad, a microphone (e.g., for voice commands)), and so forth. In embodiments, the communication interface 208 includes or is coupled to a transmitter, receiver, transceiver, physical connection interface, or any combination thereof.

In some embodiments, the controller 202 is part of a flight management system 210. For example, with reference to FIGS. 2A and 2B, the controller 202 may replace or operate in parallel with a controller 212 of the flight management system 210. In this regard, any function or operation performed by the controller 212 can alternatively be performed by controller 202, or vice versa, or the controllers 202 and 212 can perform functions or operations described herein together (e.g., by distributing and/or sharing tasks or portions thereof). In other embodiments, the communication interface 208 may facilitate connectivity between the controller 202 and the flight management system 210. For example, the communication interface 208 can be configured to communicate directly with the flight management system 210 (e.g., via an ad-hoc connection), or may be configured to communicate with the flight management system 210 over a network (e.g., a wired/wireless network).

The flight management system 210 is in communication with a plurality of sensors 218. In embodiments, the sensors 218 may include, but are not limited to: a vertical speed sensor, true airspeed sensor, groundspeed sensor, vertical acceleration sensor, altimeter, airspeed sensor, magnetic compass, global navigation satellite system (GNSS) (e.g., GPS, or the like), or any combination thereof. In some embodiments, the flight management system 210 is configured to receive sensor measurements and communicate the sensor measurements to the controller 202. In other embodiments, the controller 202 is a controller of the flight management system 210 and/or is configured to receive the sensor measurements from the sensors 218.

The flight management system 210/controller 202 can also be configured to receive other data from air traffic control, aircraft or ground servers, and so forth. For example the flight management system 210/controller 202 can be configured to receive altitude clearances (e.g., instructions to reach a target altitude within a specified amount of time and/or remain at a target altitude for a specified amount of time) and other requests/information (e.g., other flight clearances, status requests, flight path information, weather information, information from/for other aircrafts, etc.).

In embodiments, the flight management system 210 includes a controller 212, memory 214, and a communication interface 216. The controller 212 provides processing functionality for at least the flight management system 210 and can include any number of processors, micro-controllers, circuitry, field programmable gate array (FPGA) or other processing systems, and resident or external memory for storing data, executable code, and other information accessed or generated by the flight management system 210. The controller 212 can execute one or more software programs embodied in a non-transitory computer readable medium (e.g., memory 214) that implement techniques described herein. The controller 212 is not limited by the materials from which it is formed or the processing mechanisms employed therein and, as such, can be implemented via semiconductor(s) and/or transistors (e.g., using electronic integrated circuit (IC) components), and so forth.

The memory 214 can be an example of tangible, computer-readable storage medium that provides storage functionality to store various data and/or program code associated with operation of the flight management system 210/controller 212, such as software programs and/or code segments, or other data to instruct the controller 212, and possibly other components of the flight management system 210, to perform the functionality described herein. Thus, the memory 214 can store data, such as a program of instructions for operating the flight management system 210, including its components (e.g., controller 212, communication interface 216, etc.), and so forth. It should be noted that while a single memory 214 is described, a wide variety of types and combinations of memory (e.g., tangible, non-transitory memory) can be employed. The memory 214 can be integral with the controller 212, can comprise stand-alone memory, or can be a combination of both. Some examples of the memory 214 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 216 can be operatively configured to communicate with components of the flight management system 210. For example, the communication interface 216 can be configured to retrieve data from the controller 212 or other devices (e.g., controller 202, sensors 218, etc.), transmit data for storage in the memory 214, retrieve data from storage in the memory 214, and so forth. The communication interface 216 can also be communicatively coupled with the controller 212 to facilitate data transfer between components of the flight management system 210 and the controller 212. It should be noted that while the communication interface 216 is described as a component of the flight management system 210, one or more components of the communication interface 216 can be implemented as external components communicatively coupled to the flight management system 210 via a wired and/or wireless connection. The flight management system 210 can also include and/or connect to one or more input/output (I/O) devices (e.g., via the communication interface 216), such as display system 220, one or more sensors (e.g., sensors 218), an input device 209 (e.g., a flight/mode control panel 105, a mouse, a trackball, a trackpad, a joystick, a line select device, a touchpad, a touchscreen, a keyboard, a keypad, a microphone (e.g., for voice commands)), and so forth. In embodiments, the communication interface 216 includes or is coupled to a transmitter, receiver, transceiver, physical connection interface, or any combination thereof.

In embodiments, the controller 202 is configured to receive a selected target altitude. For example, the selected target altitude can be input by a user (e.g., via a user input device 209, such as the flight/mode control panel 105, or the like), based on predetermined data (e.g., based on a programmed flight plan), and/or based on an instruction/command (e.g., an altitude clearance) received from air traffic control, or the like. In some embodiments, the selected target altitude and a selected vertical speed and/or flight path angle are input via the user input device 209 (e.g., flight/mode control panel 105, or the like). The controller 202 is configured to display range and time to altitude symbology and/or values based on the selected target altitude and flight data (e.g., sensor measurements) collected by the flight management system 210.

Figure 3A:
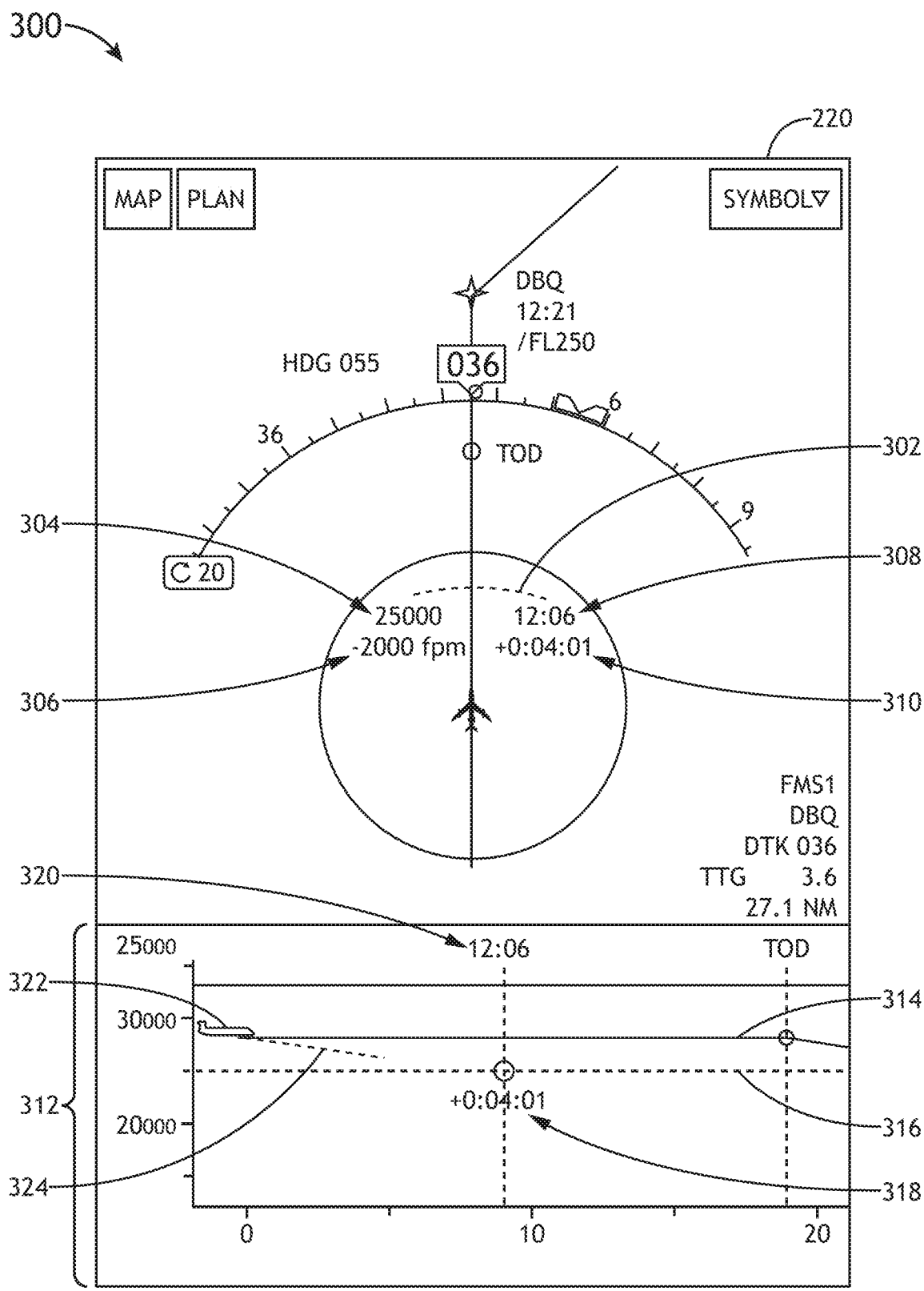
FIG. 3A is an example view of a range and time to altitude display output that can be presented via a display of an aircraft display system, such as the aircraft display system illustrated in FIGS. 2A and 2B, in accordance with example embodiments of this disclosure.
Figure 3B:
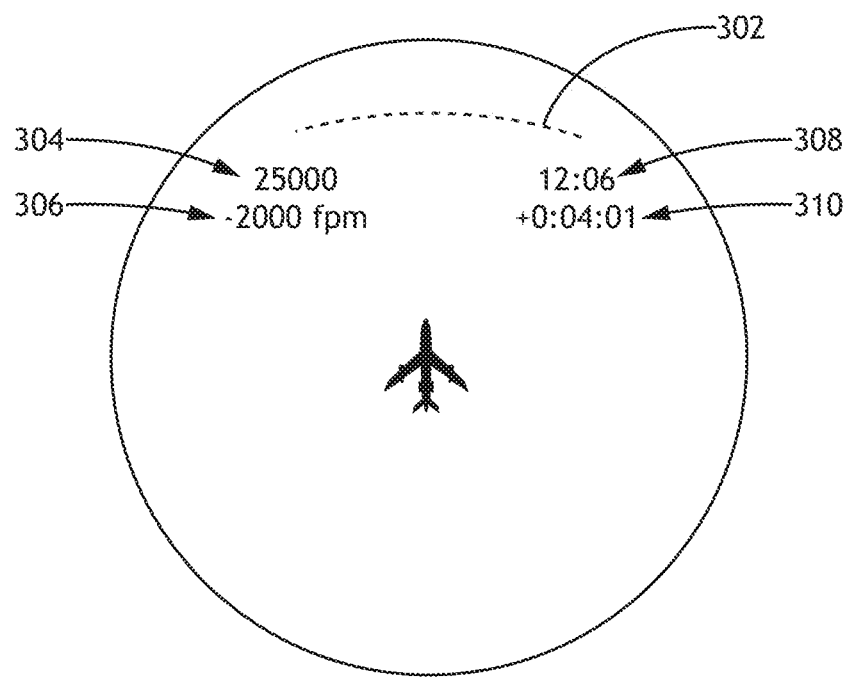
FIG. 3B is a zoomed in portion of the example view shown in FIG. 3A, in accordance with example embodiments of this disclosure.
Figure 3C:
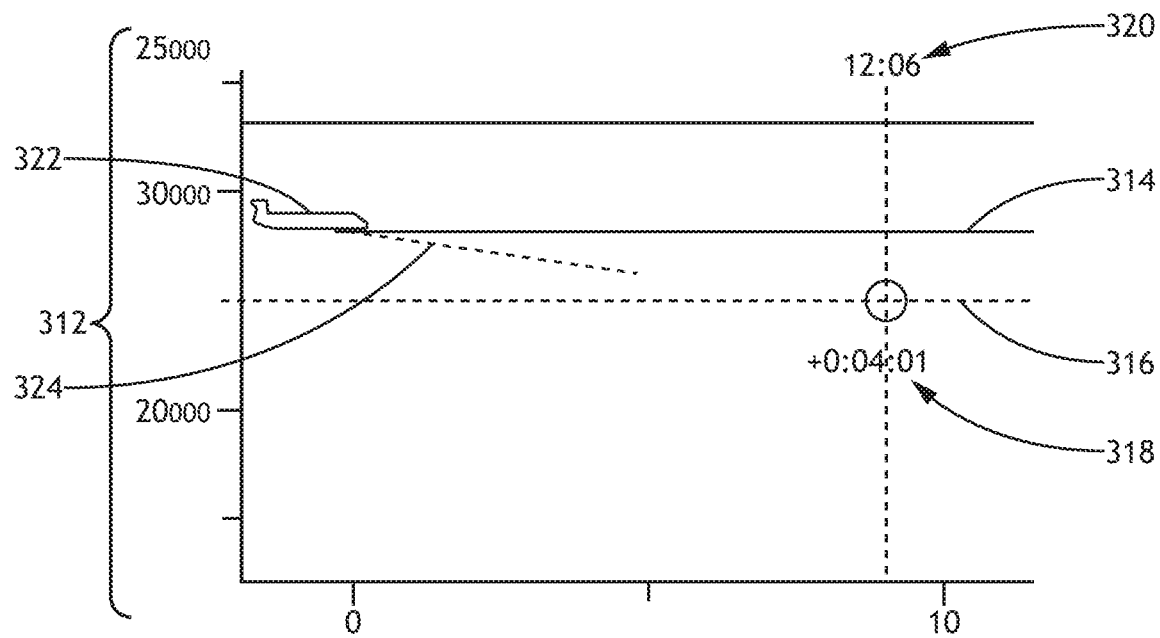
FIG. 3C is a zoomed in portion of the example view shown in FIG. 3A, in accordance with example embodiments of this disclosure.

FIGS. 3A through 3C illustrate example views of an electronic map 300 generated at a display of the display system 220. The controller 202 can be configured to generate a range to altitude arc 302 at the display of based on the selected target altitude and flight data (e.g., altitude and vertical speed and/or flight path angle) collected by the flight management system 210. For example, the range to altitude arc 302 may be displayed in response to a user selection to view the range to altitude arc 302 via the map SYMBOL menu. The range to altitude arc 302 provides a graphical indication of a distance to the selected altitude. Although the range to altitude arc 302 and other range indications on the electronic map 300 are spatially depicted (e.g., based on physical coordinates), in other embodiments, the range to altitude arc 302 and other range indications can be temporally depicted (e.g., based on times associated with physical coordinates). For example, the electronic map 300 can incorporate temporal depictions such as those described in U.S. Pat. Nos. 7,765,061 and 8,099,201, which are incorporated herein by reference in their entireties. In this regard, the "range to altitude" arc may represent a distance to the target altitude or a range in time.

The controller 202 is further configured to determine a time to altitude based on the selected target altitude and the flight data (e.g., current altitude and current and/or selected vertical speed or flight path angle) collected by the flight management system 210 from the sensors 218. In embodiments, the controller 202 is configured to compute the time to altitude based on current vertical speed, current altitude, and target altitude, as follows:

$$\frac{\text{Target Altitude} - \text{Current Altitude}}{\text{Current Vertical Speed}} = \text{Time to Altitude}$$

For example, for a selected target altitude of 25,000 ft, a current altitude of 34,000 ft, and a current vertical speed of 2000 fpm (ft per minute), the difference between the current altitude and the target altitude is 9000 ft, and the time to altitude is computed as follows:

$$\frac{9000 \text{ ft}}{2000 \text{ fpm}} = 4.5 \text{ minutes}$$

(or 4:30 minutes). It should be understood that these values are nonlimiting examples provided herein for explanatory purposes. In practice, the values will vary from one implementation to another (e.g., based on flight parameters of the aircraft in which the system 200 is implemented).

Further, it should be noted that only positive times are valid. In the example provided, it is necessary to include the positive/negative signs, i.e., Target Altitude (25000)−Current Altitude (340000)=−(negative) 9000 ft. Vertical Speed can be negative (down) or positive (up). In this case, a negative vertical speed (−2000) will result in a positive time: −9000/−2000=+4.5. If for example, the vertical speed was positive (up), then the result would be a negative time: −9000/+2000=−4.5. This is not valid because the aircraft will never achieve the altitude. Thus, in such a case, the time to altitude is infinite and thus should not be displayed. Additionally, the algorithm will result in a divide by zero error for vertical speed values of zero. Thus, for values of vertical speed=0, the time to altitude information should not be displayed, as it would again be infinite.

For large deltas (differences) between target altitude and current altitude and small vertical speeds, the time may result in a large number. For example, if the difference between target altitude and current altitude is 10000 ft, and the current vertical speed is 1 fpm, then the time would be 10000 minutes. In embodiments, to avoid excessively large and/or nonsensical readouts, the value for time to altitude may be limited to a selected or programmed range (e.g., between 0:00:01 (1 second) and 9:59:59 (9 hours, 59 minutes, 59 seconds)). In some embodiments, the time to altitude values are limited to predetermined (e.g., selected or preprogrammed) ranges and values beyond those limits are displayed as the maximum value (e.g., 9 hours, 59 minutes, 59 seconds) or minimum value (e.g., 1 second) in a caution color (e.g., yellow) to indicate that the calculated value is out of range.

The controller 202 is configured to present the time to altitude 310 in proximity to the range to altitude arc 302 at the display of the aircraft display system 220 (e.g., on the electronic map 300). For example, the range to altitude arc 302 and the time to altitude 310 (and possibly other parameters associated with the time to altitude 310) can be presented on the electronic map 300 near one another. In the embodiment illustrated in FIGS. 3A and 3B, the time to altitude 310 is listed below the range to altitude arc 302. The controller 202 can also be further configured to present the selected target altitude 304, the vertical speed 306 or flight path angle, and/or the time of arrival 308 at the target altitude in proximity to the range to altitude arc 302 and the time to altitude 310 at the display of the aircraft display system 220. The time to altitude 310 is a relative time based on a duration of time from the current time to reaching the target altitude; while the time of arrival 308 at the target altitude is an absolute time that can be determined by the controller 202 based on the time to altitude (e.g., time of arrival=current time+time to altitude). In embodiments, some or all of these time related readouts are listed below the time to altitude arc 302 on the electronic map 300 generated at the display of the aircraft display system 220 (e.g., as shown in FIGS. 3A and 3B).

The controller 202 may be further configured to generate a vertical situation display (VSD) 312 at a display of the aircraft display system 220 based on the selected target altitude and the flight data (e.g., current altitude and current and/or selected vertical speed or flight path angle) collected by the flight management system 210 from the sensors 218. For example, in FIG. 3A, the VSD 312 is presented adjacent to or over a portion of the electronic map 300 generated at the display of the aircraft display system 220. As shown in FIGS. 3A and 3C, the VSD 312 can include a graphical plot of the range to altitude with time to altitude 318 indicated in the graphical plot of the range to altitude. In embodiments, the VSD 312 may further include a symbolic representation 322 of the aircraft position, a plot line 314 indicating the planned flight path, a plot line 316 indicating the target altitude, a plot line 324 indicating the vertical speed or flight path angle, and/or the projected time of arrival 320 at the target altitude.

Figure 4A:
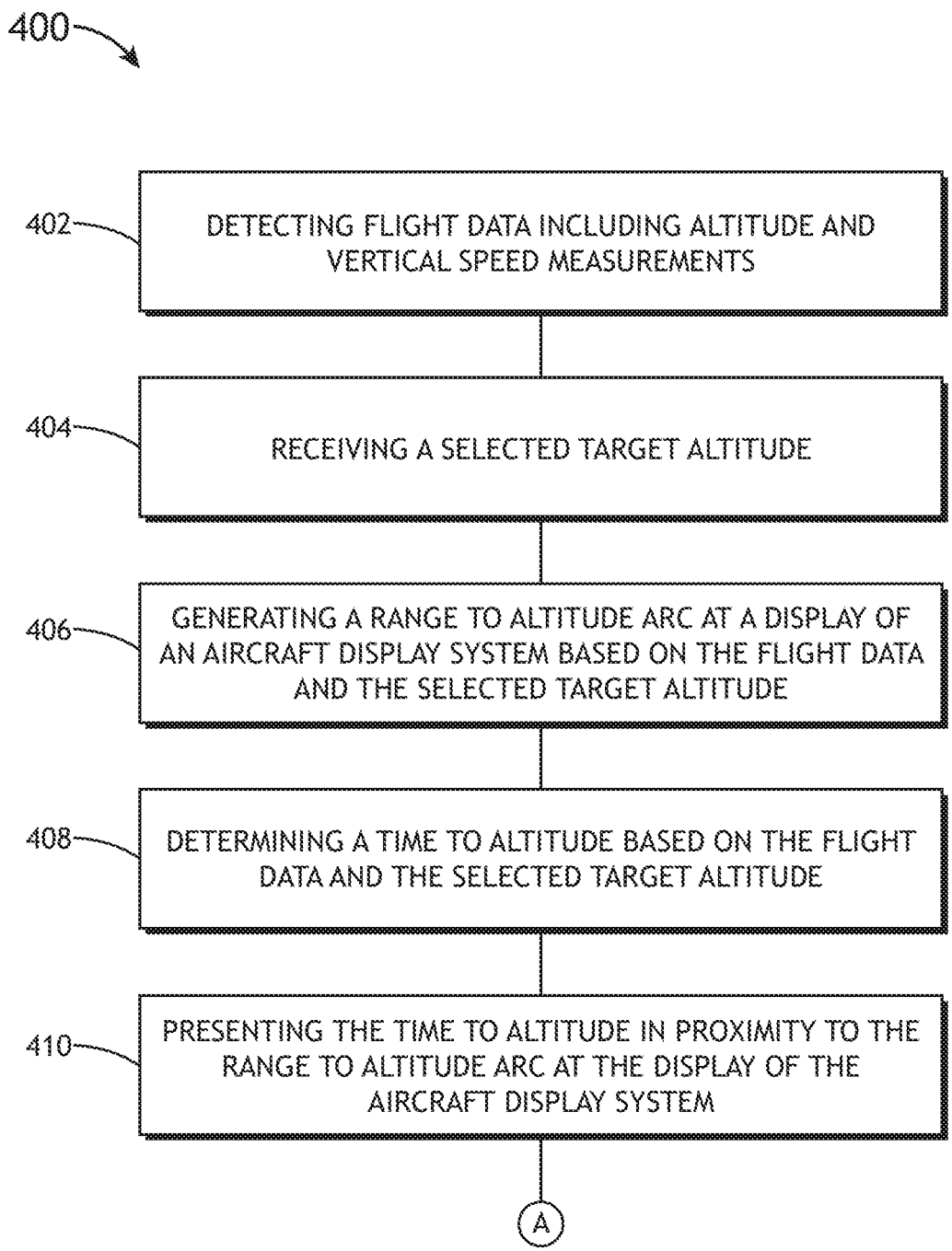
FIG. 4A is a flow diagram illustrating an example implementation of a method of displaying range and time to altitude via a display of an aircraft display system, such as the aircraft display system illustrated in FIGS. 2A and 2B.
Figure 4B:
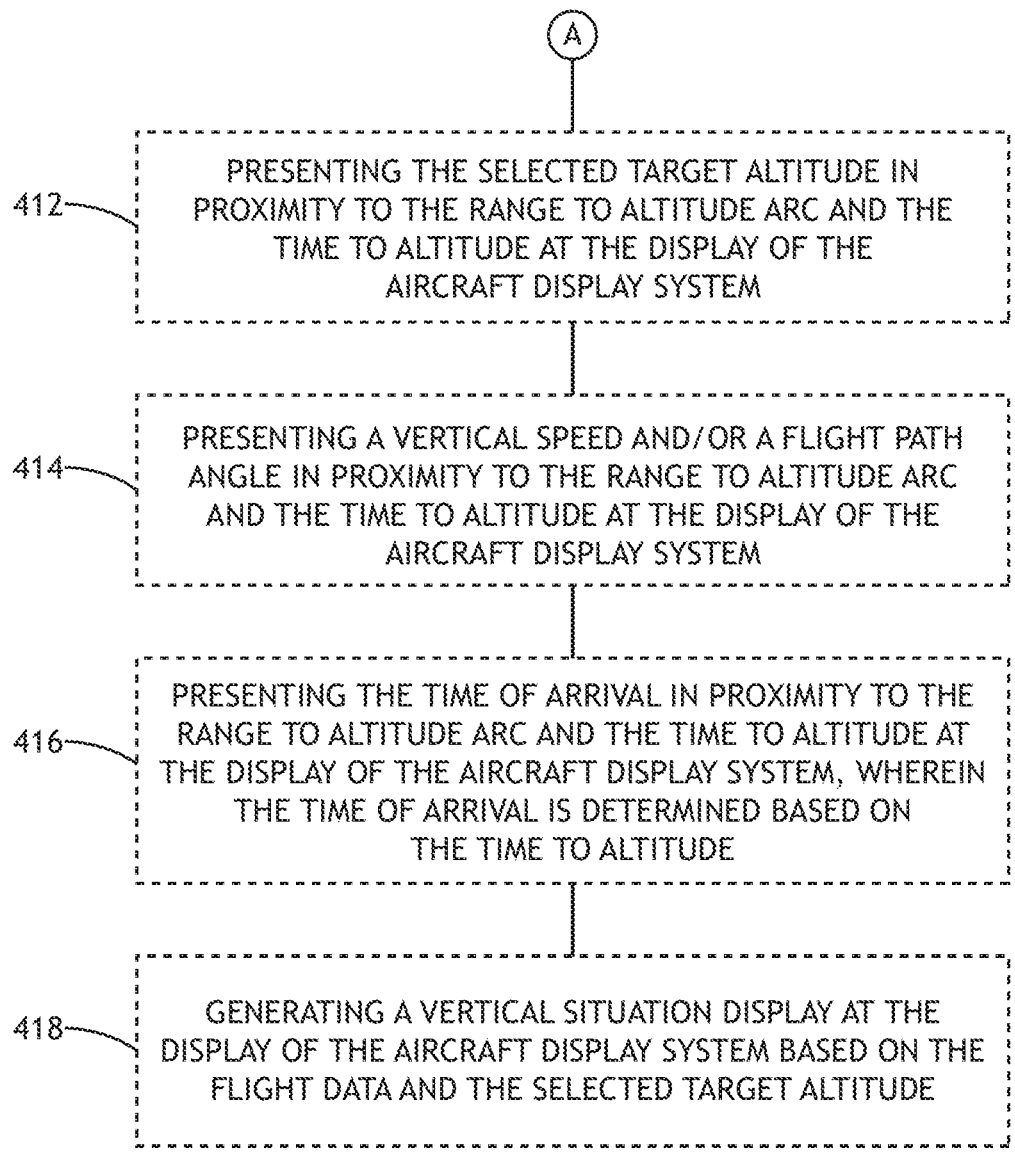
FIG. 4B is a flow diagram illustrating additional steps that may be performed in one or more example implementations of the method illustrated in FIG. 4A.

FIGS. 4A and 4B illustrate an example implementation of a method 400 that employs a system, such as the system 200 illustrated in FIGS. 2A and 2B, to display range and time to altitude for an aircraft. In general, operations of disclosed processes (e.g., method 400) may be performed in an arbitrary order, unless otherwise provided in the claims.

The method 400 includes detecting flight data including altitude and vertical speed measurements (block 402). For example, the flight data (e.g., altitude measurements, vertical speed measurements, etc.) can be collected by the flight management system 210 from a plurality of sensors 218 for the aircraft.

The method 400 further includes receiving a selected target altitude (block 404). For example, the controller 202/212 may be configured to receive the selected target altitude. In implementations, the selected target altitude can be input by a user (e.g., via a user input device), based on predetermined data (e.g., based on a programmed flight plan), and/or based on an instruction/command (e.g., an altitude clearance) received from air traffic control, or the like.

A range to altitude arc 302 is then generated at a display of an aircraft display system 220 based on the flight data and the selected target altitude (block 406). For example, the controller 202/212 can be configured to generate the range to altitude arc 302 at the display of based on the selected target altitude and flight data (e.g., altitude and vertical speed and/or flight path angle) collected by the flight management system 210.

The method 400 also includes determining a time to altitude 310 based on the flight data and the selected target altitude (block 408). For example, the controller 202/212 can be configured to determine the time to altitude 310 based on the selected target altitude and the flight data (e.g., current altitude and current and/or selected vertical speed or flight path angle) collected by the flight management system 210 from the sensors 218. In implementations, the controller 202/212 may be configured to determine the time to altitude 310 by: subtracting a current altitude from the selected target altitude to determine a difference between the current altitude and the selected target altitude; and dividing the difference between the current altitude and the selected target altitude by a current vertical speed to determine the time to altitude 310.

The time to altitude 310 can then be presented at the display of the aircraft display system 220 in proximity to the range to altitude arc 302 (block 410). For example, controller 202/212 can be configured to present the time to altitude 310 in proximity to the range to altitude arc 302 at the display of the aircraft display system 220 (e.g., on an electronic map 300, as shown in FIG. 3A).

In some implementations, the method 400 may further include presenting the selected target altitude 304 in proximity to the range to altitude arc 302 (block 412); presenting a current or selected vertical speed 306 and/or a flight path angle in proximity to the range to altitude arc 302 (block 414); and/or presenting the projected time of arrival 308 at the selected target altitude in proximity to the range to altitude arc 302 (block 416). For example, the controller 202/212 may be further configured to present the selected target altitude 304, the vertical speed 306 or flight path angle, and/or the time of arrival 308 at the target altitude in proximity to the range to altitude arc 302 and the time to altitude 310 at the display of the aircraft display system 220 (e.g., on the electronic map 300, as shown in FIG. 3A).

In some implementations, the method 400 may also include generating a VSD 312 at a display of the aircraft display system 220 based on the flight data and the selected target altitude (block 418). For example, the controller 202 may be further configured to generate a vertical situation display (VSD) 312 at a display of the aircraft display system 220 based on the selected target altitude and the flight data (e.g., current altitude and current and/or selected vertical speed or flight path angle) collected by the flight management system 210 from the sensors 218.

The method 400 may further include any step or operation implied or required by the embodiments of system 200 described herein.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for displaying range and time to altitude for an aircraft, comprising:
a flight management system in communication with a plurality of sensors, the flight management system configured to receive flight data from the plurality of sensors including altitude and vertical speed measurements;
an aircraft display system; and
a controller in communication with the flight management system and the aircraft display system, the controller configured to:
receive a selected target altitude;
generate a range to altitude arc at a display of the aircraft display system based on the flight data and the selected target altitude;
determine a time to altitude based on the flight data and the selected target altitude by:
subtracting a current altitude from the selected target altitude to determine a difference between the current altitude and the selected target altitude; and
dividing the difference between the current altitude and the selected target altitude by a current vertical speed to determine the time to altitude; and
present the time to altitude in proximity to the range to altitude arc at the display of the aircraft display system.

2. The system of claim 1, wherein the controller is further configured to present the selected target altitude in proximity to the range to altitude arc and the time to altitude at the display of the aircraft display system.

3. The system of claim 1, wherein the controller is further configured to present at least one of a vertical speed or a flight path angle in proximity to the range to altitude arc and the time to altitude at the display of the aircraft display system.

4. The system of claim 1, wherein the controller is further configured to:
determine a time of arrival at the selected target altitude based on the time to altitude; and
present the time of arrival in proximity to the range to altitude arc and the time to altitude at the display of the aircraft display system.

5. The system of claim 1, wherein the controller is further configured to generate a vertical situation display at the display of the aircraft display system based on the flight data and the selected target altitude, the vertical situation display including a graphical plot of a range to altitude with the time to altitude indicated in the graphical plot of the range to altitude.

6. The system of claim 1, wherein the flight management system includes the controller.

7. The system of claim 1, wherein the controller is communicatively coupled to the flight management system via a wired or wireless connection.

8. A controller for an aircraft display system, comprising at least one processor communicatively coupled to a memory, the memory including program instructions executable by the at least one processor and configured to cause the at least one processor to:
receive flight data including altitude and vertical speed measurements;
receive a selected target altitude;
generate a range to altitude arc at a display of the aircraft display system based on the flight data and the selected target altitude;
determine a time to altitude based on the flight data and the selected target altitude by:
subtracting a current altitude from the selected target altitude to determine a difference between the current altitude and the selected target altitude; and
dividing the difference between the current altitude and the selected target altitude by a current vertical speed to determine the time to altitude; and
present the time to altitude in proximity to the range to altitude arc at the display of the aircraft display system.

9. The controller of claim 8, wherein the program instructions are further configured to cause the at least one processor to present the selected target altitude in proximity to the range to altitude arc and the time to altitude at the display of the aircraft display system.

10. The controller of claim 8, wherein the program instructions are further configured to cause the at least one processor to present at least one of a vertical speed or a flight path angle in proximity to the range to altitude arc and the time to altitude at the display of the aircraft display system.

11. The controller of claim 8, wherein the program instructions are further configured to cause the at least one processor to:
determine a time of arrival at the selected target altitude based on the time to altitude; and
present the time of arrival in proximity to the range to altitude arc and the time to altitude at the display of the aircraft display system.

12. The controller of claim 8, wherein the program instructions are further configured to cause the at least one processor to generate a vertical situation display at the display of the aircraft display system based on the flight data and the selected target altitude, the vertical situation display including a graphical plot of a range to altitude with the time to altitude indicated in the graphical plot of the range to altitude.

13. A method of displaying range and time to altitude for an aircraft, comprising:
detecting flight data including altitude and vertical speed measurements;
receiving a selected target altitude;
generating a range to altitude arc at a display of an aircraft display system based on the flight data and the selected target altitude;
determining a time to altitude based on the flight data and the selected target altitude by:
subtracting a current altitude from the selected target altitude to determine a difference between the current altitude and the selected target altitude; and
dividing the difference between the current altitude and the selected target altitude by a current vertical speed to determine the time to altitude; and
presenting the time to altitude in proximity to the range to altitude arc at the display of the aircraft display system.

14. The method of claim 13, further comprising:
presenting the selected target altitude in proximity to the range to altitude arc and the time to altitude at the display of the aircraft display system.

15. The method of claim 13, further comprising:

presenting at least one of a vertical speed or a flight path angle in proximity to the range to altitude arc and the time to altitude at the display of the aircraft display system.

16. The method of claim 13, further comprising:
determining a time of arrival at the selected target altitude based on the time to altitude; and
presenting the time of arrival in proximity to the range to altitude arc and the time to altitude at the display of the aircraft display system.

17. The method of claim 13, further comprising:
generating a vertical situation display at the display of the aircraft display system based on the flight data and the selected target altitude, the vertical situation display including a graphical plot of a range to altitude with the time to altitude indicated in the graphical plot of the range to altitude.

* * * * *